(12) United States Patent
Grumbach et al.

(10) Patent No.: US 10,982,425 B1
(45) Date of Patent: Apr. 20, 2021

(54) APPARATUS FOR CAPTURING AND DESTROYING HAIR WITHIN A SHOWER DRAIN

(71) Applicant: NeverClog LLC, Somerville, MA (US)

(72) Inventors: Geoffrey J. Grumbach, Somerville, MA (US); Olaoluwa Faleye, Somerville, MA (US); Jacqueline Kirk, Somerville, MA (US)

(73) Assignee: NeverClog LLC, Somerville, MA (US)

( * ) Notice: Subject to any disclaimer, the term of this patent is extended or adjusted under 35 U.S.C. 154(b) by 0 days.

(21) Appl. No.: 16/996,301

(22) Filed: Aug. 18, 2020

Related U.S. Application Data

(60) Provisional application No. 62/908,626, filed on Oct. 1, 2019.

(51) Int. Cl.
| | | |
|---|---|---|
| *E03F 5/04* | (2006.01) | |
| *C02F 3/34* | (2006.01) | |
| *E03C 1/266* | (2006.01) | |

(52) U.S. Cl.
CPC ............ *E03F 5/0408* (2013.01); *C02F 3/342* (2013.01); *E03C 1/2665* (2013.01); *E03F 5/041* (2013.01)

(58) Field of Classification Search
None
See application file for complete search history.

(56) References Cited

U.S. PATENT DOCUMENTS

| | | | | |
|---|---|---|---|---|
| 394,213 A | * | 12/1888 | Scannell ................. | E03C 1/264 4/289 |
| 769,001 A | * | 8/1904 | Lawrence ............... | E03C 1/264 4/291 |
| 814,481 A | * | 3/1906 | Savard ..................... | A47K 3/02 4/584 |
| 852,044 A | * | 4/1907 | Van Der Minden .... | E03C 1/264 4/291 |
| 938,607 A | * | 11/1909 | Reed ....................... | E03C 1/264 4/291 |
| 965,836 A | * | 7/1910 | Ray ......................... | E03C 1/282 210/315 |
| 1,115,016 A | * | 10/1914 | Pheils .................... | B65F 1/1447 220/484 |
| 1,333,433 A | * | 3/1920 | Maisano ................. | E03C 1/264 4/289 |

(Continued)

FOREIGN PATENT DOCUMENTS

WO 2007086736 A2 8/2007

OTHER PUBLICATIONS

"Drain Openers", URL: https://greengobbler.com/, 2018, 3 pages.
(Continued)

*Primary Examiner* — Robert J Popovics
(74) *Attorney, Agent, or Firm* — Patent GC LLC

(57) ABSTRACT

A system for capturing and destroying hair and waste within a shower drain includes a basket placed in the drain which holds a rod including an enzyme blend. The basket captures hair or waste that is washed down shower drains. The enzyme blend neutralizes the hair or waste. The result is a clear drain and clear plumbing, with minimal manual labor. The basket does not require removal because the hair and waste are neutralized before a clog can develop. The enzyme blend is safer for both users and the plumbing systems treated than conventional drain cleaning chemicals.

15 Claims, 6 Drawing Sheets

(56) References Cited

U.S. PATENT DOCUMENTS

| | | | | |
|---|---|---|---|---|
| 1,515,073 A * | 11/1924 | Savard | ............... | E03C 1/264 4/289 |
| 1,612,588 A * | 12/1926 | Lacoste | ............... | E03C 1/264 4/291 |
| 1,770,639 A * | 7/1930 | Sanders | ............... | E03C 1/2302 4/691 |
| 1,835,447 A * | 12/1931 | Alland | ............... | E03C 1/264 4/287 |
| 1,855,904 A * | 4/1932 | Brown | ............... | B01D 35/02 210/422 |
| 2,028,520 A * | 1/1936 | Phillips | ............... | B01D 29/117 210/300 |
| 2,077,516 A * | 4/1937 | Dart | ............... | E03C 1/308 4/286 |
| 2,087,592 A * | 7/1937 | Chesnut | ............... | E03C 1/126 510/195 |
| 2,285,833 A * | 6/1942 | Platt | ............... | E03C 1/264 210/238 |
| 2,505,305 A * | 4/1950 | Schaefer | ............... | E03C 1/264 4/289 |
| 2,506,669 A * | 5/1950 | Heuacker | ............... | E03C 1/264 4/292 |
| 2,723,905 A * | 11/1955 | Coakley | ............... | E03C 1/126 422/278 |
| 3,112,499 A * | 12/1963 | Thornton | ............... | A61L 2/16 4/222 |
| 3,665,526 A * | 5/1972 | Hoffman | ............... | A47K 1/14 4/287 |
| 4,045,351 A * | 8/1977 | Peterson | ............... | B01D 35/02 210/238 |
| 4,060,494 A * | 11/1977 | Schoenholz | ............... | C11D 3/0042 134/2 |
| 4,088,596 A * | 5/1978 | Arai | ............... | C11D 3/3942 134/2 |
| 4,207,631 A * | 6/1980 | Baggey | ............... | E03C 1/264 4/286 |
| 4,278,455 A * | 7/1981 | Nardi | ............... | B01D 46/0024 210/323.2 |
| 4,294,087 A * | 10/1981 | Monsheimer | ............... | C14C 1/065 69/21 |
| 4,380,834 A * | 4/1983 | Wentz | ............... | E03C 1/23 4/286 |
| 4,416,854 A * | 11/1983 | Nielsen | ............... | A01N 59/16 205/701 |
| 4,506,015 A * | 3/1985 | Ho | ............... | C12N 11/14 435/175 |
| 4,540,506 A * | 9/1985 | Jacobson | ............... | C11D 3/386 510/195 |
| 4,810,385 A * | 3/1989 | Hater | ............... | C02F 1/688 210/150 |
| 4,932,082 A * | 6/1990 | Ridgeway | ............... | E03C 1/23 4/287 |
| 4,984,307 A * | 1/1991 | Thomas | ............... | E03D 9/031 4/226.1 |
| 5,003,642 A * | 4/1991 | Robb | ............... | E03C 1/262 210/164 |
| 5,004,025 A * | 4/1991 | Robbins | ............... | E03C 1/30 141/364 |
| 5,019,346 A * | 5/1991 | Richter | ............... | A61L 2/18 134/22.14 |
| 5,025,946 A * | 6/1991 | Butkovich | ............... | B60K 15/0403 220/86.3 |
| 5,160,525 A * | 11/1992 | Stillman | ............... | B09C 1/10 210/606 |
| 5,197,455 A * | 3/1993 | Tessien | ............... | A47J 37/079 126/144 |
| 5,312,545 A * | 5/1994 | Starin | ............... | B01D 35/027 210/172.6 |
| 5,312,624 A * | 5/1994 | Richter | ............... | A61L 2/18 4/222 |
| 5,354,468 A * | 10/1994 | Richards | ............... | E03C 1/126 210/448 |
| D357,306 S * | 4/1995 | Lenox | ............... | D23/260 |
| 5,905,037 A * | 5/1999 | Cooney, Jr. | ............... | C12P 19/02 210/601 |
| 5,915,847 A * | 6/1999 | Spears | ............... | E03C 1/262 4/287 |
| 6,067,669 A * | 5/2000 | Peterson | ............... | E03C 1/262 4/287 |
| 6,195,819 B1 * | 3/2001 | Wang | ............... | A47K 1/14 4/287 |
| 6,197,321 B1 * | 3/2001 | Richter | ............... | A61L 2/18 4/290 |
| 6,200,484 B1 * | 3/2001 | McInnis | ............... | E03F 1/00 210/164 |
| 6,248,234 B1 * | 6/2001 | Cline | ............... | C02F 1/688 210/170.01 |
| 6,283,013 B1 * | 9/2001 | Romandy | ............... | A47J 31/0636 99/319 |
| 6,385,799 B1 | 5/2002 | Doyen | | |
| 6,387,261 B1 * | 5/2002 | Mojena | ............... | B01D 24/008 210/315 |
| 6,479,444 B1 * | 11/2002 | Porticos | ............... | C11D 1/94 510/195 |
| 6,487,729 B2 * | 12/2002 | Delanzo | ............... | E03C 1/264 4/286 |
| 6,491,814 B1 * | 12/2002 | Wheeler | ............... | E03C 1/264 210/164 |
| 6,558,538 B2 * | 5/2003 | Scuilla | ............... | E03C 1/126 210/198.1 |
| 6,666,966 B1 * | 12/2003 | Schluttig | ............... | E03C 1/126 210/163 |
| 6,676,842 B2 * | 1/2004 | Scuilla | ............... | E03C 1/126 210/754 |
| 6,915,814 B2 * | 7/2005 | Cheng | ............... | F16L 55/24 137/247.51 |
| 7,098,174 B2 * | 8/2006 | Takemura | ............... | A01N 25/34 4/222 |
| 7,107,634 B1 | 9/2006 | Baird | | |
| 7,150,576 B1 * | 12/2006 | Kambeyanda | ............... | E03C 1/282 401/292 |
| 7,376,983 B1 * | 5/2008 | Sciarrino | ............... | E03C 1/264 4/288 |
| 7,458,108 B2 * | 12/2008 | Wolf | ............... | A47K 1/14 4/222 |
| 7,610,635 B2 * | 11/2009 | Schultz | ............... | E03C 1/30 4/294 |
| 7,618,532 B2 * | 11/2009 | Worth | ............... | E03C 1/126 210/164 |
| 7,704,386 B2 * | 4/2010 | Ventura | ............... | E03C 1/264 210/163 |
| 7,887,697 B2 * | 2/2011 | Worth | ............... | E03C 1/126 210/164 |
| D637,698 S * | 5/2011 | Greene | ............... | D23/268 |
| D644,072 S * | 8/2011 | McDonald | ............... | D7/667 |
| 8,011,030 B2 * | 9/2011 | Li | ............... | E03C 1/262 4/287 |
| 8,112,823 B2 * | 2/2012 | Dombrowski | ............... | E03C 1/2665 4/222.1 |
| 8,136,173 B2 * | 3/2012 | Knox | ............... | E03C 1/262 4/287 |
| 8,182,702 B2 * | 5/2012 | Al-Sannaa | ............... | B01D 46/0012 210/806 |
| D669,969 S * | 10/2012 | Forrest | ............... | D23/261 |
| 8,382,993 B1 | 2/2013 | Wisek et al. | | |
| 8,409,433 B2 * | 4/2013 | Worth | ............... | C02F 1/68 210/163 |
| 8,545,697 B2 * | 10/2013 | Thorgersen | ............... | C02F 1/688 210/170.03 |
| 8,590,065 B2 * | 11/2013 | Ali | ............... | A47K 1/14 4/287 |
| 8,721,880 B2 * | 5/2014 | Worth | ............... | C02F 1/68 210/163 |
| 8,910,322 B2 * | 12/2014 | Briggs | ............... | E03C 1/264 4/255.01 |
| 9,060,656 B2 * | 6/2015 | Tong | ............... | A47K 1/14 |
| 9,150,444 B2 * | 10/2015 | Frazier | ............... | C02F 1/72 |
| D747,140 S * | 1/2016 | Roth | ............... | D7/400 |

(56) References Cited

U.S. PATENT DOCUMENTS

| | | | |
|---|---|---|---|
| 9,334,181 B2 * | 5/2016 | Worth | C02F 1/68 |
| 9,371,636 B2 * | 6/2016 | Ali | E03C 1/2302 |
| 9,469,979 B1 * | 10/2016 | Cappa | A61L 9/01 |
| 9,499,962 B2 * | 11/2016 | Joseph | E03C 1/262 |
| 9,611,631 B2 * | 4/2017 | Rosko | E03C 1/262 |
| D792,562 S * | 7/2017 | Ali | D23/261 |
| D794,759 S * | 8/2017 | Karnegie | D23/261 |
| 9,745,728 B2 | 8/2017 | Beck et al. | |
| D812,183 S * | 3/2018 | McGavin | D22/122 |
| D815,895 S * | 4/2018 | Roth | D7/400 |
| 9,945,106 B2 * | 4/2018 | Ali | A47K 1/14 |
| 9,975,792 B2 * | 5/2018 | Thorgersen | C12N 1/20 |
| 9,982,418 B2 * | 5/2018 | Bennett | E03B 7/095 |
| D820,638 S * | 6/2018 | Chitayat | D7/400 |
| 9,994,465 B2 * | 6/2018 | Epstein | E03F 5/041 |
| 10,024,039 B2 * | 7/2018 | Cheng | E03C 1/264 |
| 10,106,967 B2 * | 10/2018 | Sebolt | E03C 1/262 |
| D836,756 S * | 12/2018 | Myers, II | E03C 1/26 D23/261 |
| D841,133 S * | 2/2019 | Karnegie | D23/261 |
| D851,225 S * | 6/2019 | Karnegie | D23/261 |
| 10,344,460 B2 * | 7/2019 | Karnegie | E03C 1/264 |
| 10,463,999 B2 * | 11/2019 | Washington | B01D 35/005 |
| 10,486,990 B2 * | 11/2019 | Epstein | C02F 1/68 |
| 10,501,917 B2 * | 12/2019 | Ali | E03C 1/262 |
| D873,972 S * | 1/2020 | Hayes | D23/261 |
| 10,570,594 B2 * | 2/2020 | Karnegie | E03C 1/262 |
| 10,570,595 B2 * | 2/2020 | Sebolt | E03C 1/2302 |
| 10,794,794 B2 * | 10/2020 | Bowdle | G01M 9/065 |
| D900,982 S * | 11/2020 | Rosario | D23/261 |
| 2002/0158028 A1 * | 10/2002 | Scuilla | E03C 1/126 210/764 |
| 2004/0255378 A1 * | 12/2004 | Tracy | E03C 1/23 4/689 |
| 2007/0262006 A1 * | 11/2007 | Worth | E03F 5/041 210/164 |
| 2008/0168596 A1 * | 7/2008 | Findlay | A47K 1/14 4/287 |
| 2008/0276392 A1 * | 11/2008 | Schultz | E03C 1/126 15/104.33 |
| 2008/0287297 A1 * | 11/2008 | Scholer | A01N 63/00 504/117 |
| 2009/0110618 A1 * | 4/2009 | Dombrowski | A61L 2/23 422/291 |
| 2009/0263884 A1 * | 10/2009 | Mehta | C11D 3/3902 435/252.1 |
| 2010/0000011 A1 * | 1/2010 | Angarita | E03C 1/262 4/287 |
| 2010/0155345 A1 * | 6/2010 | Al-Sannaa | B01D 46/4236 210/806 |
| 2012/0125372 A1 * | 5/2012 | Dombrowski | A61L 2/23 134/22.11 |
| 2012/0266372 A1 * | 10/2012 | Epstein | C02F 1/68 4/290 |
| 2014/0054236 A1 * | 2/2014 | Bennett | E03B 7/095 210/747.3 |
| 2014/0231323 A1 * | 8/2014 | Worth | E03F 5/041 210/166 |
| 2015/0190741 A1 * | 7/2015 | Washington | B01D 35/005 141/11 |
| 2016/0215483 A1 * | 7/2016 | Landon | C11D 3/38636 |
| 2016/0244955 A1 * | 8/2016 | Allred, III | E03C 1/126 |
| 2016/0251839 A1 | 9/2016 | Ali | |
| 2016/0354727 A1 * | 12/2016 | Denvir | B01D 61/147 |
| 2018/0290906 A1 * | 10/2018 | Epstein | E03F 5/041 |
| 2019/0233766 A1 * | 8/2019 | Pont | C11D 3/38645 |
| 2019/0368184 A1 * | 12/2019 | Lo | E03F 5/0408 |
| 2020/0315943 A1 * | 10/2020 | Speight | A61Q 19/10 |

OTHER PUBLICATIONS

Lally, "Drain Strain Update—What Happened After Shark Tank", Dec. 5, 2016, 8 pages.

Drano, "Drano® Liquid Drain Cleaner", retrieved on Aug. 30, 2020, 1 page.

"Drano Sales", Consumer Goods & FMCG, Cleaning Products, Sales of the leading drain cleaner brands in the United States in 2016, retrieved on Aug. 30, 2020, 1 page.

Liquid Plumr, "Pro-Strength Liquid-Plumr® Clog Destroyer + Pipeguard", retrieved on Aug. 30, 2020, 1 page.

"TubShroom", A Revolution in Drain Protection, retrieved on Aug. 30, 2020, 1 page.

* cited by examiner

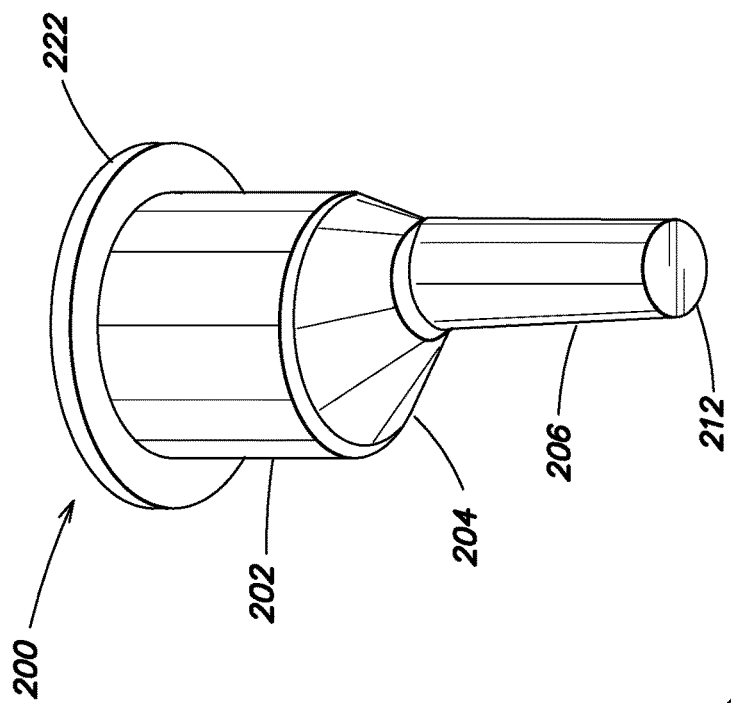
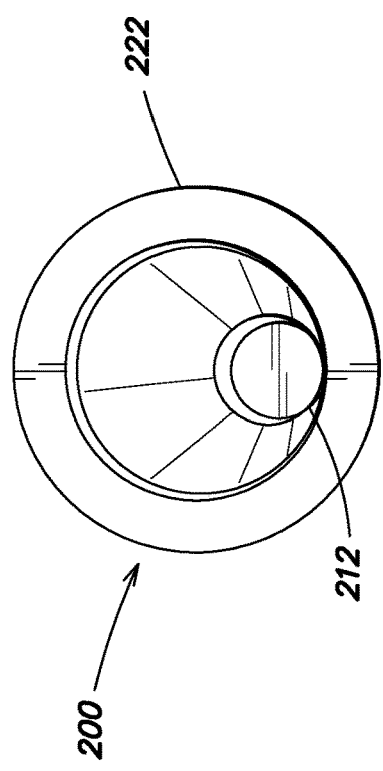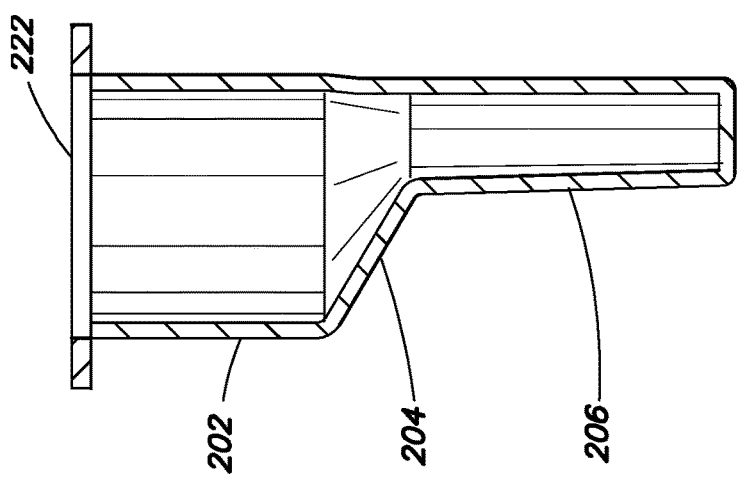

APPARATUS FOR CAPTURING AND DESTROYING HAIR WITHIN A SHOWER DRAIN

CROSS-REFERENCE TO RELATED APPLICATIONS

This application is a non-provisional application of U.S. Provisional Patent Application Ser. No. 62/908/626, filed Oct. 1, 2019, entitled "An apparatus for capturing and destroying hair within a shower drain", which is hereby incorporated by reference.

BACKGROUND

Hair and waste buildup often cause drain clogging and water backup in a shower, especially communal showers. Unclogging a shower drain can be time consuming, expensive, disgusting, and often dangerous. As hair and waste build up on the inside of a shower drain, adhered buildup requires powerful chemicals to break it down. Industrial drain maintenance generally includes monitoring for clogs, manual drain "snaking", and applying powerfully corrosive chemicals based largely on acidic compounds to remove clogs.

SUMMARY

A system for capturing and destroying hair and waste within a shower drain includes a basket placed in the drain which holds a rod including an enzyme blend. The basket captures hair or waste that is washed down the shower drain. The enzyme blend neutralizes the hair or waste captured in the basket. The result is a clear drain and clear plumbing with minimal manual labor. The basket does not require removal because the hair and waste are neutralized before a clog can develop. The enzyme blend is safer for both users and the plumbing systems treated than conventional drain cleaning chemicals.

The basket is designed to allow water to flow through the basket and into drain pipes, while pushing hair and waste to a waste chamber in the basket. The basket has an outer diameter compatible with a shower drain pipe. The basket also can have a lofted outer lip or other extension which allows the basket to be supported by the inlet of the shower drain. An upper section allows water to flow without allowing hair or waste to escape, by employing a first set of small holes. A middle section of the basket directs hair or waste to a waste chamber. Finally, the waste chamber has a second set of smaller holes positioned at a distance above the bottom of the waste chamber to keep a level of standing water or reservoir in the wage chamber, while allowing excess water to flow out. The enzyme rod is placed in the waste chamber, supported by the bottom of the basket. In the waste chamber, the enzyme rod decomposes hair or waste into a liquid-based state.

The enzyme rod can include an enzyme blend which attacks sulfur bonds in hair while being accelerated by other catalysts. Because the basket captures hair or waste, thereby preventing the captured hair and waste from sticking to the inside of pipes, the enzyme blend does not need to attack chemical bonds that form between the hair or waste and the pipes. Thus, because the basket and enzyme rod prevents clogs due to hair or waste from occurring, the enzyme rod can incorporate naturally occurring and non-harmful chemicals, which is more environmentally friendly and safer on skin than conventional clog removers. The enzyme blend includes primarily Keratinase and Amylase, and can include other materials such as Trypsin, Sodium Thioglycolate, and/or Sodium Hydroxide. The enzyme blend can work using a delayed decomposition method.

The enzyme rod can be formed in any desired shape, but the shape should allow the rod to be placed into the waste chamber through drain holes in any shower drain cover. For example, the medium of the enzyme can be a powder which can be pressed compactly to create a rod or other desired shape.

The enzyme rod can be coated with a reaction delaying compound, which is a chemical that delays the reactivity of the enzyme after the rod submerged in water. The coating can be regressive from top to bottom, so as to intentionally activate the rod incrementally. For example, after an enzyme rod is pressed into a compacted, dense rod, it can then be coated with calcium sulfate or polyvinyl alcohol. The medium can be added in increasing amounts from bottom to top of the rod, so as to create a fuse-like delay in decomposition. As the bottom of the enzyme rod disintegrates and begins to break down the waste, the rod itself drops down which allows the rod to slowly activate rather than breakdown all at once and wash out. Rather than allow the entire rod to dissolve at once, the geometry of the rod and the levels of calcium sulfate coating allows level of the rod closer to the bottom of the waste chamber to be activated before levels closer to the top of the waste chamber.

The system can be installed in the drain and remain in the drain, without having to unscrew any shower drain cover to replenish the enzyme rod and/or to clean the drain by hand. If the basket is full with hair or waste, the enzyme rod has probably been depleted, and a new enzyme rod can be dropped through any hole in the shower drain cover and into the chamber in the basket The basket can include a sensor system. The sensor system can include a set of phototransistors and/or photoresistors to detect whether the basket is full. A threshold can be set for the sensors so that, when enough hair or waste accumulates in the basket, a signal can be triggered, indicating that an enzyme rod should be placed in the basket. The signal can be, for example, a signal activating a light emitting diode (LED) on top of the outer rim the basket. An individual can determine whether to insert an enzyme rod or not based on inspection of the basket, or a regular replacement schedule, or a triggered signal from a sensor.

BRIEF DESCRIPTION OF DRAWINGS

FIG. 9 is a bottom plan view of the drain basket of FIG. 6.

FIG. 8 is a cross-section of the side plan view of FIG. 6 along line B-B.

FIG. 10 is a perspective view of the drain basket of FIG. 6.

DETAILED DESCRIPTION

Figure 1:
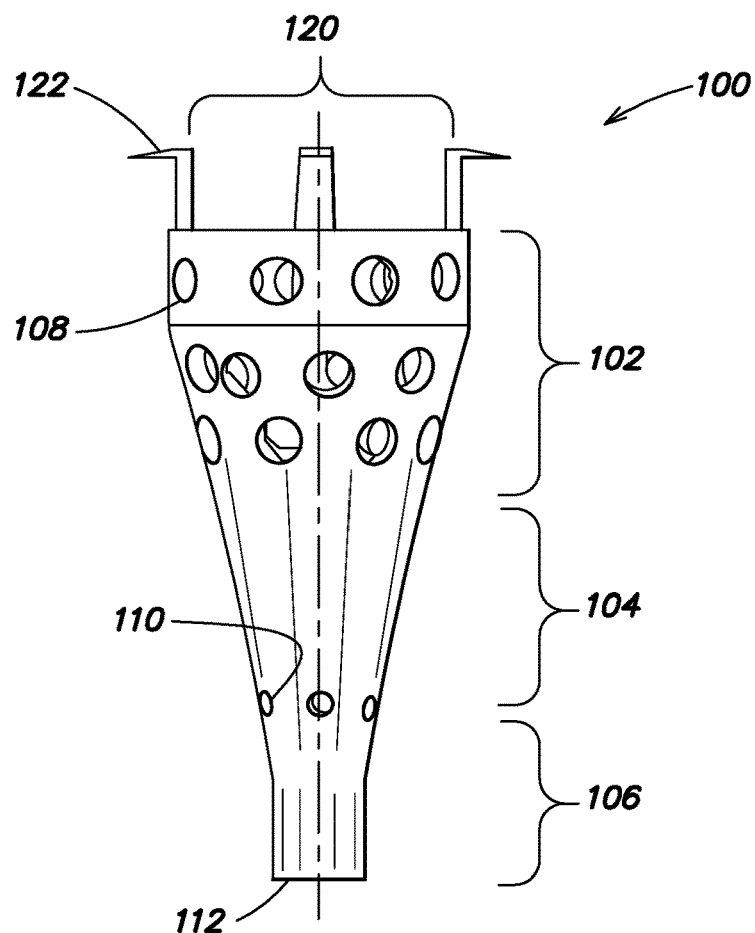
FIG. 1 is a side plan view of an illustrative example of a drain basket.

Turning now to FIGS. 1 through 5, a first illustrative example of construction of a drain basket will now be described. The basket 100 has an outer diameter 120 compatible with a shower drain pipe. The basket also can have a lofted outer lip or other extension 122 which allows the basket to be supported by the inlet of the shower drain. An upper section 102 allows water to flow without allowing hair or waste to escape, by employing a first set of small holes 108 in steep walls. A middle section 104 of the basket directs hair or waste to a waste chamber 106. The waste chamber has a second set of smaller holes 110 positioned at a distance above the bottom of the waste chamber, and the bottom of the basket 112 does not have holes, to keep a level of standing water or reservoir in the waste chamber, while allowing excess water to flow out of the holes 110. The continuous narrowing of the inner diameter of the basket from the top section 102, to the middle section 104 to the waste chamber 106 allows for minimal water backup and optimal draining. The enzyme rod is placed in the waste chamber, supported by the bottom 112 of the basket. Holes 110 allow excess water to flow freely out of the basket while trapping a specific amount of water to activate the enzyme blend which acts on hair or waste captured in the waste chamber 106.

The basket can be constructed using durable plastics or stainless steel. The construction of the basket allows it to withstand hundreds of uses without decomposing or needing manual cleaning. The basket, once constructed, is installed simply by removing the drain cover and placing the basket snugly into the drain mouth, for which a standard inner diameter is about 2.0 inches. After re-installing the drain cover, the basket installation is complete. The enzyme rod can be sized to fit holes in the drain cover, allowing the enzyme rod to be dropped into the waste chamber of the basket through the drain cover.

Figure 2:
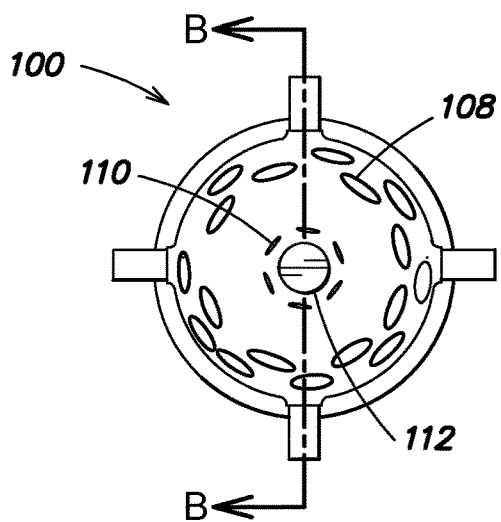
FIG. 2 is a top plan view of the drain basket of FIG. 1.
Figure 3:
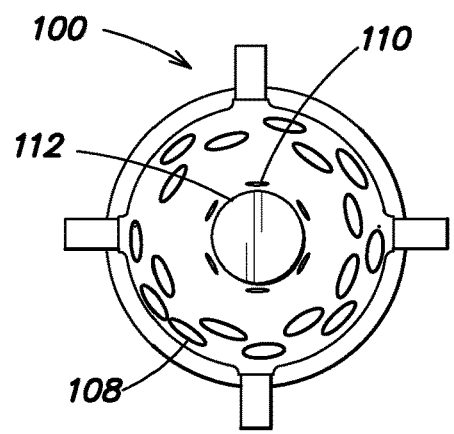
FIG. 3 is a bottom plan view of the drain basket of FIG. 1.
Figure 4:
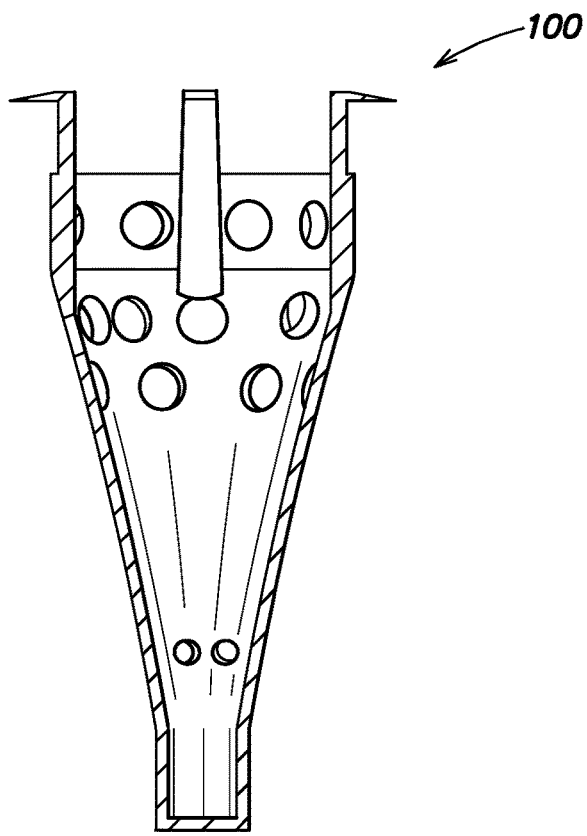
FIG. 4 is a cross-section of the side plan view of FIG. 1 along line B-B of FIG. 2.
Figure 5:
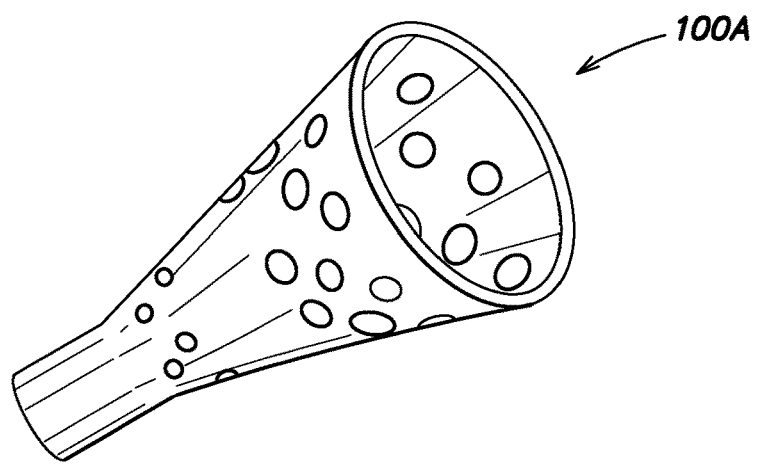
FIG. 5 is a perspective view of another illustrative example of a drain basket.

A top plan view is illustrated in FIG. 2. The waste chamber has a bottom 112, above which are narrower holes 110. Larger holes 108 are in the top section of the drain basket. Extensions 122 can support the drain basket hanging the basket on the top of the shower drain. A bottom plan view is illustrated in FIG. 3. The bottom 112 is larger in FIG. 3 than in FIG. 2 due to the thickness of the material forming the basket. Narrower holes 110 are above the bottom 112; larger holes 108 are in the top section of the drain basket. A cross-section along line B-B in FIG. 2 is shown in FIG. 4. A perspective view of another illustrative example of a drain basket 100A without the extensions 122 is shown in FIG. 5.

In one example construction, the basket can have a 1.6 inches, universally-compatible, outer diameter, along with a lofted 2.2 inches, universally-compatible, outer lip, which allows the basket to snugly fit shower drain compliant with plumbing regulations used in the United States. The drain basket can be, for example, approximately 3.25 inches long from extensions 122 to the bottom 112. In FIGS. 1 through 5, the drain basket is illustrated as having three rows of larger diameter holes 108 in the upper section 102 of the basket. Such holes can be, for example about 0.25 inches in diameter. The waste chamber 112 has a pattern of holes 110 of a smaller diameter at the top of the waste chamber. For example, a bottom row of holes 110 can be about 1.0 inches from the bottom 112 of the waste chamber. One or more rows of holes 110 can be provided one implementation, such holes 110 can have a diameter of about 0.125 inches.

Furthermore, the basket is designed for optimal performance and efficiency. The 1.5" upper section allows for maximum water flow, without allowing hair or waste to escape, by employing a system of ¼" diameter holes. The middle section of the basket directs hair to the waste chamber without allowing any waste to escape or water to backup into the shower. Finally, the waste chamber employs ⅛" holes to carefully keep the desired level of standing water while flowing out excess water.

Turning now to FIGS. 6 through 10, a second illustrative example of construction of a drain basket will now be described. The basket 200 has an outer diameter 220 compatible with a shower drain pipe. The basket also can have a lofted outer lip 222 which allows the basket to be supported by the inlet of the shower drain. An upper section 202 allows water to flow without allowing hair or waste to escape, by employing a first set of small holes (not shown) in steep walls. A middle section 204 of the basket directs hair or waste to a waste chamber 206. The middle section may also have holes (not shown). The waste chamber 206 has a second set of smaller holes (not shown) positioned at a distance above the bottom of the waste chamber, and the bottom of the basket 212 does not have holes to keep a level of standing water or reservoir in the waste chamber 200, while allowing excess water to flow out of the second set of holes. The continuous narrowing of the inner diameter of the basket from the top section 202, to the middle section 204 to the waste chamber 206 allows for minimal water backup and optimal draining. The enzyme rod is placed in the waste chamber 206, supported by the bottom 212 of the basket. The second set of holes near the top of the waste chamber allow excess water to flow freely out of the basket while trapping a specific amount of water to activate the enzyme blend which acts on hair or waste captured in the waste chamber 206.

Figure 6:
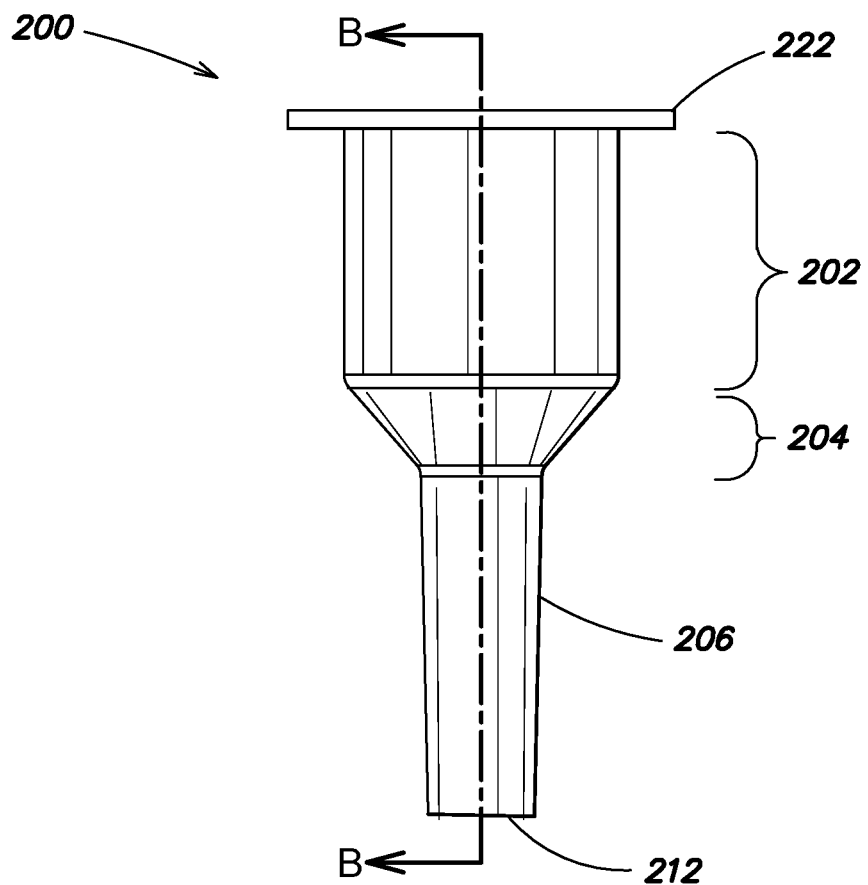
FIG. 6 is a side plan view of an illustrative example of a drain basket.
Figure 7:
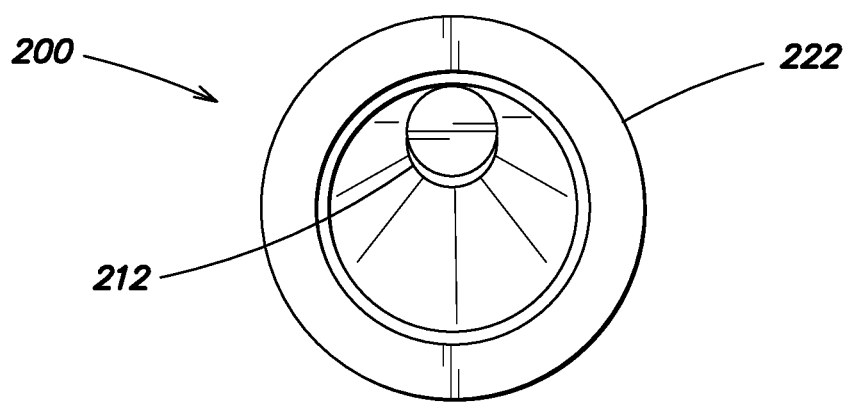
FIG. 7 is a top plan view of the drain basket of FIG. 6.

A top plan view is illustrated in FIG. 7. The waste chamber has a bottom 212, above which are narrower holes (not shown). Larger holes (not shown) are in at least the top section 202 of the drain basket. A lip 222 can support the drain basket by hanging the basket on the top of the shower drain. A bottom plan view is illustrated in FIG. 9. The bottom 212 is larger in FIG. 9 than in FIG. 7 due to the thickness of the material forming the basket. Narrower holes (not shown) can be formed above the bottom 112; larger holes (not shown) can be formed in at least the top section of the drain basket. A cross-section along line B-B in FIG. 6 is shown in FIG. 8. A perspective view of this illustrative example of a drain basket 200 is shown in FIG. 10.

FIGS. 6 through 10 do not illustrate any particular hole patterns, since any of a variety of hole patterns can be used. Generally, holes the top section are more numerous and larger than holes at the top of the waste chamber.

Figure 11:
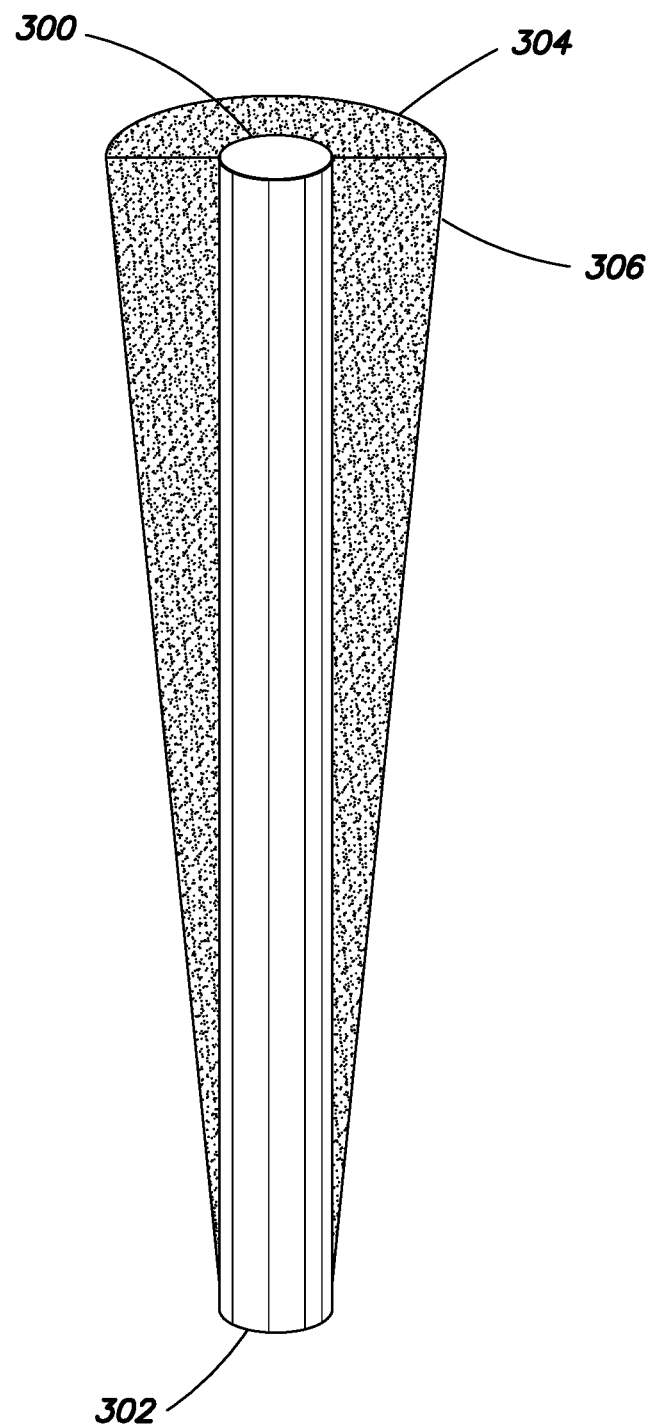
FIG. 11 is a perspective, cross-sectional view of an illustrative example of an enzyme rod with a coating.

Turning now to FIG. 11, the enzyme rod 300 includes an enzyme blend which attacks sulfur bonds in hair while being accelerated by other catalysts. Because the basket prevents hair or waste from sticking to the inside of pipes, the enzyme blend does not need to attack chemical bonds that form between waste and pipes. Thus, because the basket and enzyme rod prevent clogs due to hair or waste from occurring, the enzyme rod can incorporate naturally occurring and non-harmful chemicals, which is more environmentally friendly and safer on skin than conventional clog removers. The enzyme blend includes primarily Keratinase and Amylase, and can include other materials such as Trypsin, Sodium Thioglycolate, and/or Sodium Hydroxide. The enzyme blend can work as a delayed decomposition method.

In one example formulation, a suitable mixture can include:

1. Keratinase: 20% to 35%
2. Amylase: 20% to 35%
3. Sodium Hydroxide: 5% to 30%
4. (Optional) Base medium: 5% to 20%
5. (Optional) Trypsin: 10% to 20%
6. (Optional) Sodium Thioglycolate: 5% to 30%
7. (Optional) Polyvinyl Alcohol: 5% to 15%

The enzyme rod can be formed in any desired shape, but the shape should allow the rod to be placed into the waste chamber through drain holes in any shower drain cover. For example, the medium of the enzyme can be a powder which can be pressed compactly to create a rod or other desired shape. The invention is not limited to a substantially cylindrically shaped rod as shown in FIG. 11, nor should the term "rod" be construed to imply any particular shape. So long as the shape of the rod allows the rod to be supported by the bottom of the waste chamber, and to pass through the shower drain cover, any shape of the rod is suitable.

The enzyme rod can be coated with a reaction delaying compound 306, which is a chemical that delays the reactivity of to enzyme after the rod submerged in water. The coating can be regressive from top to bottom, so as to intentionally activate the rod incrementally. For example, after an enzyme rod is pressed into a compacted, dense rod, it can then be coated with calcium sulfate. As shown in FIG. 11, the calcium sulfate can be added in increasing amounts from bottom 302 of the rod to top 304 of the rod, so as to create a fuse-like delay in decomposition. As the bottom of the enzyme rod disintegrates and begins to break down the waste, the rod itself drops down which allows the rod to slowly activate rather than break down all at once and wash out. Rather than allow the entire rod to dissolve at once, the geometry of the rod and the levels of calcium sulfate coating allow a level of the rod closer to the bottom of the waste chamber to be activated before levels closer to the top of the waste chamber. This mechanism is easily identified by geometry of the rod as well as the appearance of the rod, indicating which way down.

The enzyme rod and the drain basket work in a symbiotic relationship. The basket allows the rod to activate in a small, targeted area of waste collection. Furthermore, the rod installation is as simple as dropping it through a drain cover each time the bottom of the drain basket fills with hair.

Figure 12A:
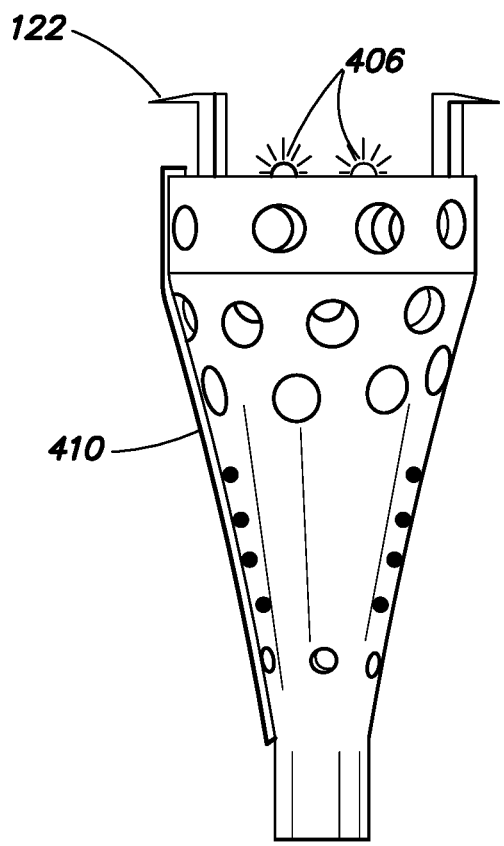
FIGS. 12A and 12B show an illustrative example of a drain basket with a sensor.
Figure 12B:
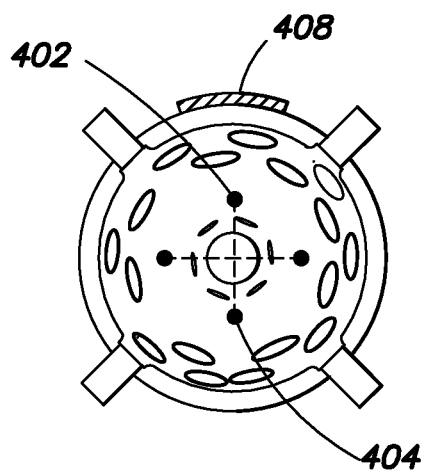

As shown in FIG. 12, a basket 400 can include a sensor system. The sensor system can include, for example, a set of phototransistors 402 and/or photoresistors 404 using infrared light to sense whether the basket is full. These can be placed at or just above the holes (e.g., 110 in FIG. 1) above the waste chamber. A small battery, similar to batteries used in a watch or a smoke detector, can be used to power the sensor system, and can be attached near the top and on the outside of the basket (e.g., at 408). The battery can employ an indication system similar to the common smoke detector. Wiring 410 and a small custom circuit board (not shown) allow diverse programming options, such as Internet connectivity and computer learning. A threshold can be set for the sensors so that, when enough hair or waste accumulates in the basket, a signal can be triggered, indicating that an enzyme rod should be placed in the basket. The signal can be, for example, a signal activating at least one light emitting diode (LED) 406 on top of the outer rim of the basket. There may be two LED's, e.g., one green (signifying adequate operation) and one red (signifying time for replacement). An individual can determine whether to insert an enzyme rod or not based on inspection of the basket, or a regular replacement schedule, or a triggered signal from a sensor.

It should be understood that the subject matter defined in the appended claims is not necessarily limited to the specific implementations described above. The specific implementations described above are disclosed as examples only.

What is claimed is:

1. A system for capturing and breaking down hair or waste in a plumbing drain, said system comprising:
    a drain basket, including:
        an upper section including a tapered upper wall having a first plurality of holes extending therethrough at an upper end thereof, and a second plurality of holes extending through said tapered wall at a lower end thereof; and
        a lower section having a lower wall extending from a bottom end of said tapered wall to a bottom wall, which together define a waste chamber;
    a rod sized to fit within said drain basket and including:
        a first medium including an enzyme blend of keratinase and amylase formed into the shape of a rod; and
        a coating of calcium sulfate and/or polyvinyl alcohol on said rod for delaying reaction of said first medium with said hair or waste.

2. The system of claim 1, wherein said first medium additionally includes a compound selected from the group consisting of: trypsin, sodium thioglycolate, and sodium hydroxide.

3. The system of claim 2, wherein said first medium additionally includes trypsin.

4. The system of claim 2, wherein said first medium additionally includes sodium thioglycolate.

5. The system of claim 2, wherein said first medium additionally includes sodium hydroxide.

6. The system of claim 1, wherein said coating decreases in thickness from a top to a bottom of said rod.

7. The system of claim 1, wherein said lower wall is cylindrical.

8. The system of claim 1, wherein said upper section further includes an upper cylindrical wall section extending from an upper end of said tapered wall.

9. The system of claim 8, wherein said upper cylindrical wall section extending from an upper end of said tapered wall further includes a third plurality of holes extending therethrough.

10. The system of claim 8, wherein said upper cylindrical wall section extending from an upper end of said tapered wall further includes extensions for hanging said drain basket from said plumbing drain.

11. The system of claim 1, wherein said tapered wall includes a portion between said first plurality of holes and said second plurality of holes that is free of holes.

12. The system of claim 1, wherein said first plurality of holes has a larger diameter than said second plurality of holes.

13. The system of claim 1, wherein said first plurality of holes and said third plurality of holes are of substantially the same diameter.

14. The system of claim 1, wherein said drain basket is constructed from stainless steel.

15. The system of claim 1, wherein said drain basket is constructed from a plastic material.

* * * * *